Feb. 12, 1952  F. W. CALDWELL ET AL  2,585,089
RESILIENT CLAMP
Filed Nov. 16, 1949

F. W. Caldwell
J. P. Sharp
INVENTOR

BY *C. A. Snowles.*
ATTORNEYS.

Patented Feb. 12, 1952

2,585,089

UNITED STATES PATENT OFFICE 2,585,089

RESILIENT CLAMP

Ford Weddington Caldwell and John Pinkney Sharp, Humboldt, Tenn.

Application November 16, 1949, Serial No. 127,692

1 Claim. (Cl. 24—261)

This invention relates to a fishing boat anchor, particularly adapted by reason of its novel construction, for attachment to a bush, tree, or similar object for the purpose of holding a boat while fishing, etc.

An important object of the present invention is to provide a device of the type stated which can be manufactured at relatively low cost, will be durable, and is speedily and easily attached to an object of the type mentioned.

Still another important object is to provide a device of the character described which will efficiently grip the object to which it is attached in such a manner as to prevent detachment until such time as the user releases the anchor from the gripped object.

With the foregoing and other objects in view which will appear as the description proceeds, the invention consists of certain novel details of constructions and combinations of parts hereinafter more fully described and pointed out in the claims, it being understood that changes may be made in the construction and arrangement of parts without departing from the spirit of the invention as claimed.

Referring to the drawings

Figure 1:
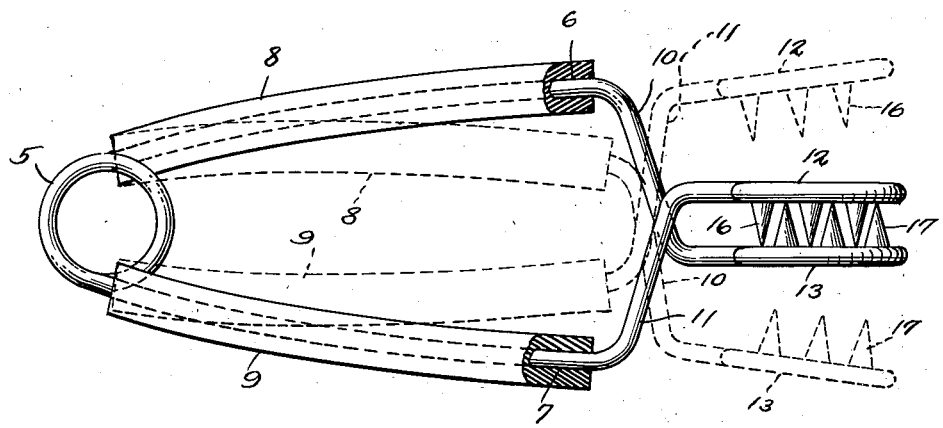
Figure 1 is a side elevational view of a fishing boat anchor constructed in accordance with the invention, the dotted lines indicating the position of the parts prior to gripping of an object therewith.

Referring to the drawings in detail, the fishing boat anchor formed in accordance with the present invention includes a single piece of stout, heavy spring wire material bent to shape, said wire material being formed at a location centrally disposed between the ends thereof with one or more spring loops 5 from which extend a pair of forwardly diverging arms 6 and 7 of suitable length to be readily gripped in the user's hand, said arms 6 and 7 being preferably provided with the lengths of rubber tubing 8 and 9 surrounding the same for the purpose of comfort during the grasping of the arms.

Figure 3:
Fig. 3 is an enlarged section on line 3—3 of Fig. 2.

The forward portions of the arms 6 and 7 are inturned towards each other as at 10 and 11 and cross each other adjacent the front end of the fishing boat anchor, and the end portions of the wire material are then formed into oblong loops 12 and 13 disposed in spaced parallel planes. The loops 12 and 13 respectively are filled by oblong plates 14 and 15 the edges of which are grooved to receive the loops as is best seen in Fig. 3.

Secured to the inner surface of the plate 14 is a plurality of conical teeth or prongs 16, the points of which engage the opposite plate 15. The plate 15, in this connection, is also provided with a plurality of conical sharply pointed teeth 17 the points of which engage the inner surface of the plate 14. The plates 16 and 17 are disposed in a staggered arrangement so as to cooperate in gripping an object such as a tree or tree branch, not shown. The teeth 16 and 17, in this connection, are fixedly mounted in proper position by means of rivets 18 or similar devices.

We believe the use of the device formed in accordance with the invention will be readily apparent. A rope, not shown, is attached at one end to the boat and at the other end is extended through the spring loop 5. When it is desired to secure the anchor to an object, the user simply grasps the arms 6 and 7 and presses them towards each other, to the dotted line positions illustrated in Fig. 1. This spreads the jaws to the dotted line positions illustrated in Fig. 1, and said jaws are positioned on either side of an object to be gripped. The arms 6 and 7 are then released, and immediately the spring action of the loop 5 will cause the jaws to tightly grip and become impaled in the surface of said object.

In this way, the device serves as a fishing boat anchor, and the user can conduct fishing operations with the boat being securely held against drifting. When it is desired to release the anchor, the arms 6 and 7 are simply gripped and pressed towards each other whereby the jaws are released from the gripped object.

Figure 2:
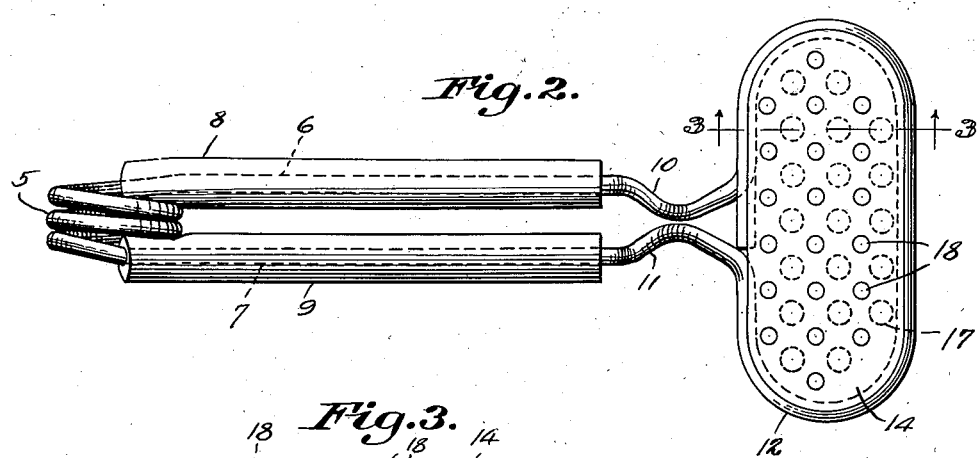
Fig. 2 is a top plan view.

With further reference to the arrangement and formation of the teeth, it may be noted that the teeth of one plate are not only spaced substantially from each other, but also, are spaced from the teeth of the opposite plate, so that when the plates are in the closed position seen in Fig. 3, no tooth is in contact with another tooth. It is a further important characteristic, in this connection, that the teeth of both plates extend over a substantial area approximately rectangular or oblong, as readily seen from Fig. 2. Still another important characteristic is the fact that the pointed ends of the teeth of one plate engage against the surface of the opposing plate, in the areas between the teeth of said opposing plate.

By reason of this construction, wherein the teeth of the respective plates are disposed over an elongated wire area defined by the shape of the plates, with spaces intervening between all adjacent teeth, the anchor is adapted to be engaged and to grip with complete efficiency any object of any thickness, rigidity, or shape. Thus, the jaws are engageable with relatively thick tree branches, small thin twigs, matted vines, or canvas or other fabric.

What is claimed is:

A fishing boat anchor comprising a single length of wire material of circular cross section formed intermediate its ends with a spring loop, said length of wire material including arms diverging forwardly from said loop to provide hand grips, the forward portions of said arms being extended in forwardly converging relation and crossing adjacent the front end of the anchor, each of said forward portions being formed into a plane, oblong loop of closed formation, plates filling and secured to the respective loops, each of said plates being formed with a continuous peripheral groove of semi-circular cross section receiving one of said loops, and conical sharply pointed teeth mounted on the inner surfaces of the respective plates, said teeth being disposed in alternating relation and being adapted to grip an object, the teeth of one plate being spaced wholly from one another and from the teeth of the opposite plate, the pointed ends of the teeth of one plate engaging against the surface of the other plate in the areas intervening between the teeth of said other plate.

FORD WEDDINGTON CALDWELL.
JOHN PINKNEY SHARP.

REFERENCES CITED

The following references are of record in the file of this patent:

UNITED STATES PATENTS

| Number | Name | Date |
|---|---|---|
| 380,125 | Lewis | Mar. 27, 1888 |
| 437,877 | Truax | Oct. 7, 1890 |
| 474,719 | Brande | May 10, 1892 |
| 1,105,855 | Smith | Aug. 4, 1914 |
| 1,141,152 | Stahl | June 1, 1915 |

FOREIGN PATENTS

| Number | Country | Date |
|---|---|---|
| 24,168 | Great Britain | of 1912 |
| 54,991 | Switzerland | May 5, 1911 |